United States Patent [19]
Wood

[11] Patent Number: 5,402,745
[45] Date of Patent: Apr. 4, 1995

[54] IN-LINE ROTATIONAL POSITIONING MODULE FOR TOWED ARRAY PARAVANES

[75] Inventor: Edwin H. Wood, North Franklin, Conn.

[73] Assignee: The United States of America as represented by the Secretary of the Navy, Washington, D.C.

[21] Appl. No.: 236,858

[22] Filed: May 2, 1994

[51] Int. Cl.$^6$ ............................................. B63G 8/14
[52] U.S. Cl. .................................... 114/244; 114/245
[58] Field of Search ............... 114/242, 244, 245, 246, 114/253, 254; 367/17, 154

[56] References Cited

U.S. PATENT DOCUMENTS

| | | | |
|---|---|---|---|
| 3,704,681 | 12/1972 | Campbell et al. | 114/245 |
| 4,290,124 | 9/1981 | Cole | 114/245 |
| 4,350,111 | 9/1982 | Boyce, II | 114/245 |
| 4,711,194 | 12/1987 | Fowler | 114/245 |

Primary Examiner—Stephen P. Avila
Attorney, Agent, or Firm—Michael J. McGowan; Prithvi C. Lall; Michael F. Oglo

[57] ABSTRACT

A rotary positioning module (RPM) for a paravane for use in connection with a cable or hose towed from a towing platform through a towing medium. The RPM includes a stationary portion and a rotational portion, The stationary portion is adapted to be attached to the cable or hose, and includes a plurality of electrically-energizable field windings symmetrically positioned around the cable or hose, The rotational portion is rotatably mounted around the stationary portion for controlling orientation of rotary positioning module wings attached thereto as it is being towed through the towing medium to facilitate the positioning of the cable or hose in a towed array. The rotational portion includes a plurality of permanent magnets symmetrically positioned around the stationary portion in proximity to the field windings of the stationary portion and a rotary position sensor. The rotational position sensor senses the angular position of the rotational portion relative to the stationary portion and enables a controller on a towing platform to control the electric current to the field windings to facilitate the angular positioning of the rotational portion in relation to the stationary portion.

9 Claims, 4 Drawing Sheets

IN-LINE ROTATIONAL POSITIONING MODULE FOR TOWED ARRAY PARAVANES

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

1. Field of the Invention

The invention relates generally to the field of positioning and leveling arrangements for cables towed, for example, by ships in an ocean environment, and more particularly to paravanes used to position towed arrays streaming behind a towing platform. The invention provides rotational power and control for paravanes.

2. Description of the Prior Art

In, for example, seismic imaging and other similar operations in an ocean environment, sonar devices are generally towed in an array behind towing platforms, such as ships, over an area to be imaged.

The array may comprise a one-dimensional array, in which the sonar devices are attached to a single cable and allowed to stream behind the towing platform. Alternatively, the array may comprise a two-dimensional array, in which a plurality of cables are provided, all of which are to be towed behind the towing platform, and which are to be separated horizontally by selected distances. Positioning devices termed "paravanes" are provided in, in particular, two-dimensional arrays to prevent the cables in the array from converging, which could otherwise occur since the towing force for cables of a two-dimensional array is essentially provided from a single point, namely, the towing platform. Paravanes may also be provided for one-dimensional arrays to facilitate control of the towing depth of the cables in the array, and thus control the depth of the sonar devices below the ocean surface.

Typically, a paravane comprises a body from which two wings extend, with the wings being generally affixed to the body. The body attaches to the cable so that the wings extend outwardly in a plane generally corresponding the longitudinal axis of the attached cable. The plane of the wings is inclined slightly with respect to the longitudinal axis of the cable, which facilitates control of the positioning of the cable relative to the towing platform. The angular position of the paravane with respect to the cable, and thus with respect to the medium through which the cable is to be towed, provides a lateral force which can affect the horizontal position of the cable with respect to the towing direction. By suitably controlling the angular orientation of paravanes on cables in a multiple-cable array, the horizontal separations of the cables in a two-dimensional array can be maintained. The angular orientation of paravanes may be provided by careful control of placement of each paravane on a cable or by suitably weighting one wing or the other. Both of these solutions can present problems, particularly in connection with deploying the array cables.

U.S. Pat. No. 4,711,194, to Fowler, entitled "Streamer Interface Adapter Cable Mounted Leveler" describes a device for controlling the angular orientation of a paravane using an electrical motor. That device, however, includes an appendage that houses the electrical apparatus which is affixed to one side of the paravane. This forms an asymmetric assembly, which also complicates proper orientation of the paravane, and in addition increases the drag of the paravane as the array is being towed through the medium. There is thus a need for an arrangement which is free of these problems.

SUMMARY OF THE INVENTION

The invention provides a new and improved device for facilitating the angular orientation of a paravane around a towing cable.

Briefly stated, the invention provides a rotary positioning device (hereinafter "RPM") for use in connection with a cable or hose towed from a towing platform through a towing medium. The RPM includes a stationary portion and a rotational portion. The stationary portion is adapted to be attached to the cable or hose, and includes a plurality of electrically-energizable field windings symmetrically positioned around its periphery. The rotational portion is rotatably mounted around the stationary portion for controlling orientation of a paravane attached thereto as the paravane is being towed through the towing medium to facilitate the positioning of the cable. The rotational portion includes a plurality of permanent magnets symmetrically positioned around the stationary portion in proximity to the field windings of the stationary portion, to facilitate the angular positioning of the rotational portion in relation to the stationary portion by controlling electrical current provided to the field windings in response to a signal from a rotational positioning sensor which senses the relative position of the field windings and the permanent magnets.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN PREFERRED EMBODIMENT

Figure 1:
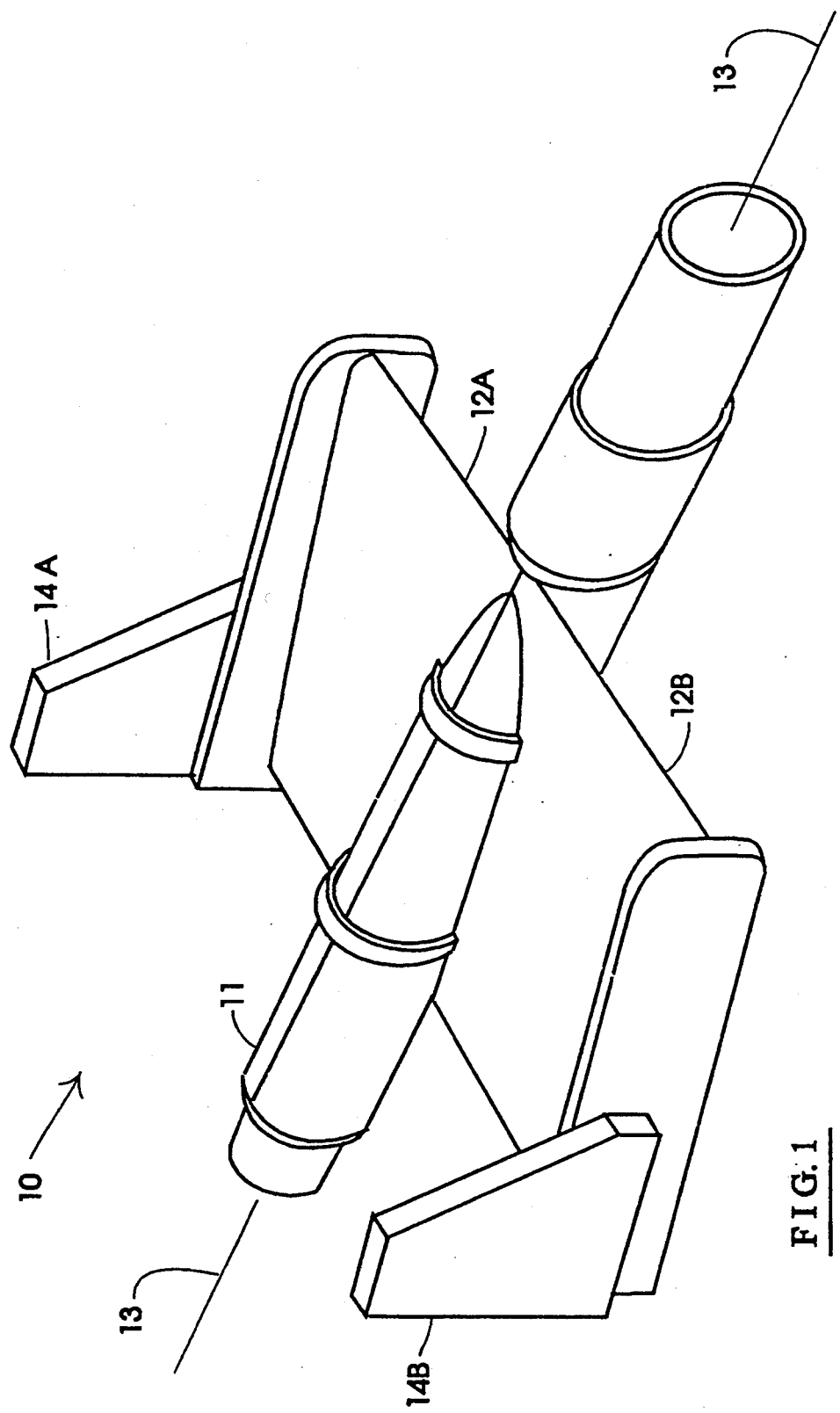
FIG. 1 is a diagrammatic illustration of a paravane constructed in accordance with the invention.

FIG. 1 is a diagrammatic illustration of a typical paravane in with reference to FIG. 1, paravane 10 includes a generally central body 11 and hydrodynamic lift members such as wings 12A, 12B, extending laterally therefrom. The central body 11 has an elongated, generally cylindrical form, and essentially comprises a rotational positioning module (RPM) which will be described below in FIGS. 2 through 4. The central body 11 defines a longitudinal axis 13, and extending through the central body 11 along the axis 13 is a passage (shown in FIGS. 2 through 4 under reference numeral 23) through which a cable or hose, forming part of a towed array, can be inserted and attached as described below.

As can be seen in FIG. 1, the wings 12A, 12B extend outwardly from the central body generally in the same plane, the plane being inclined slightly from the axis 13. The wings 12A, 12B may include, at their tips, fixed stabilizers 14A, 14B, extending generally orthogonal thereto. As will also be described below, the central body controls the angular orientation of the wings 12A, 12B, in relation to the cable or hose to which the paravane 10 is attached, as the array is being towed through a medium, such as ocean water, by a towing device such as a ship or towing platform. As the towing device tows the cable or hose along a particular towing line, the angular orientation of the wings 12A, 12B, controls the displacement, from the towing line, of the particular cable or hose. In addition, if the cable or hose forms part of an array of cables or hoses, by maintaining various angular orientations of paravane 10 thereon, the cables or hoses can be forced into a two-dimensional array in which they have differing horizontal displacements from the towing line, and thus various horizontal distances from each other. In addition, the angular orientation of the paravanes 10 can further control the depth of the cable or hose in the towing medium. The fixed stabilizers 14A, 14B can help minimize possible pitching forces that may be applied by the paravane 10 to the cable or hose as it is being towed through the towing medium.

Figure 2:
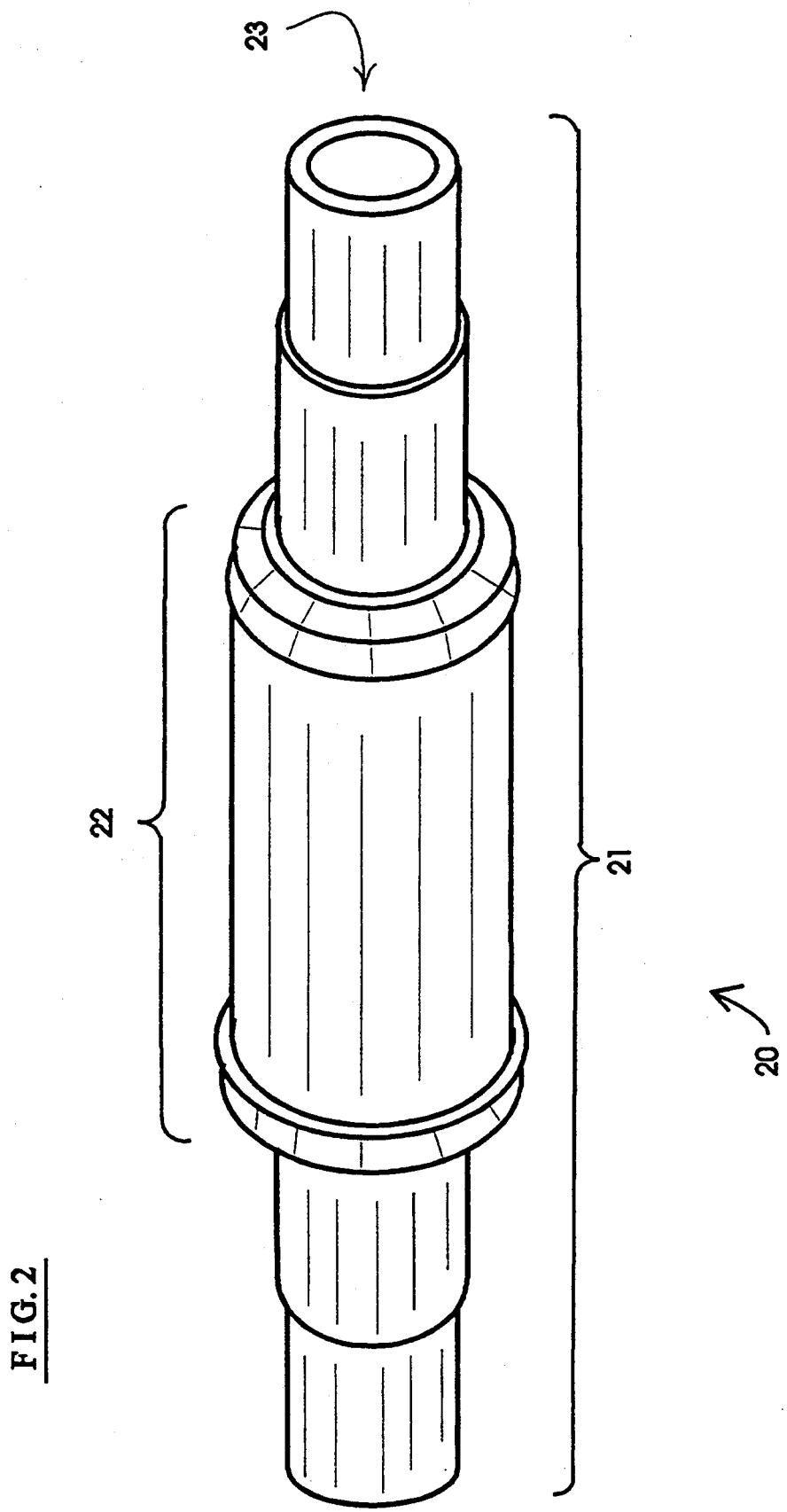
FIG. 2 depicts an illustration of rotational positioning module (RPM) for the paravane depicted in FIG. 1.
Figure 3:
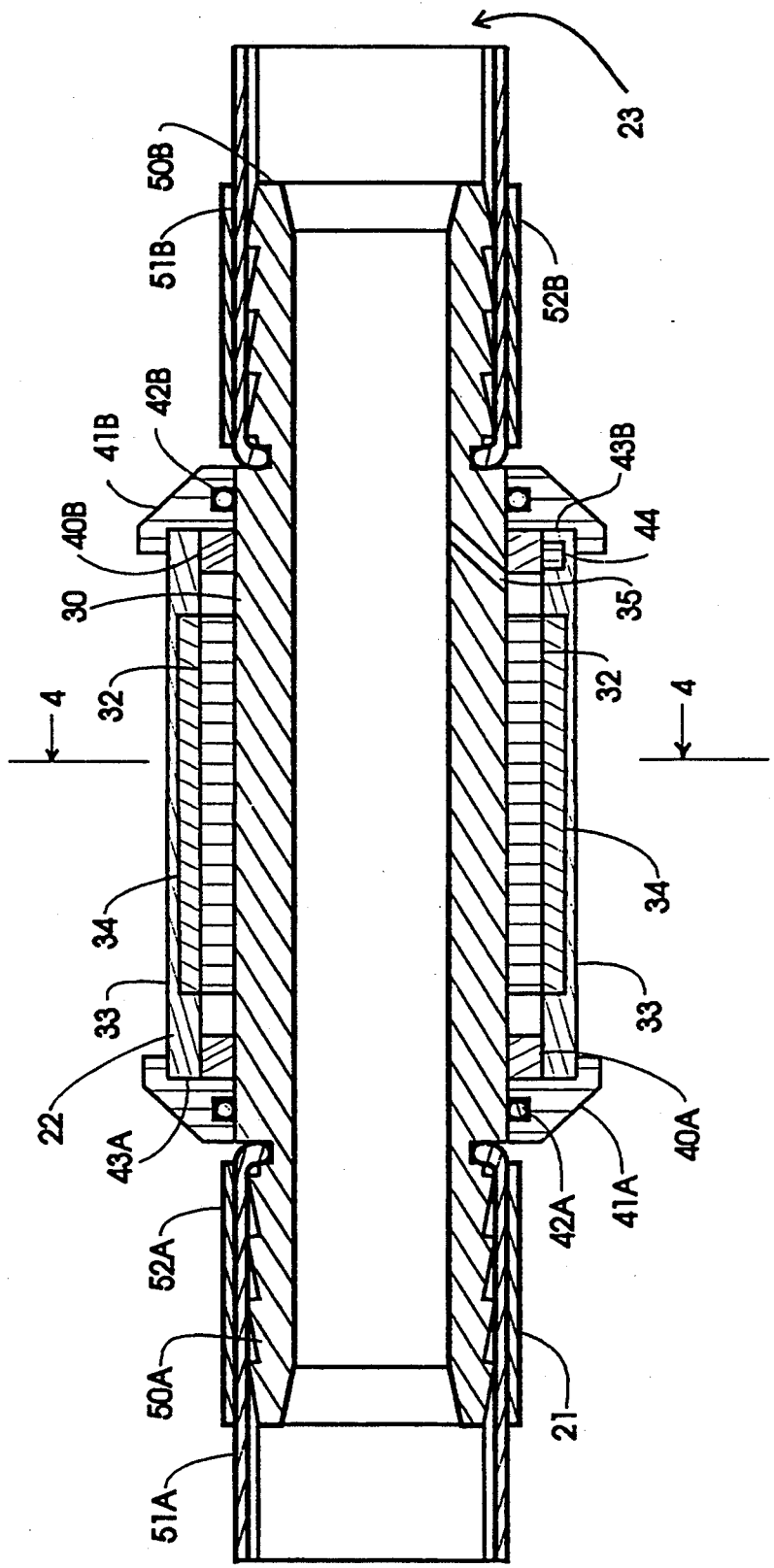
FIG. 3 depicts a section of the rotational positioning module (RPM) shown in FIG. 2, the section being taken along the longitudinal axis of the module.
Figure 4:
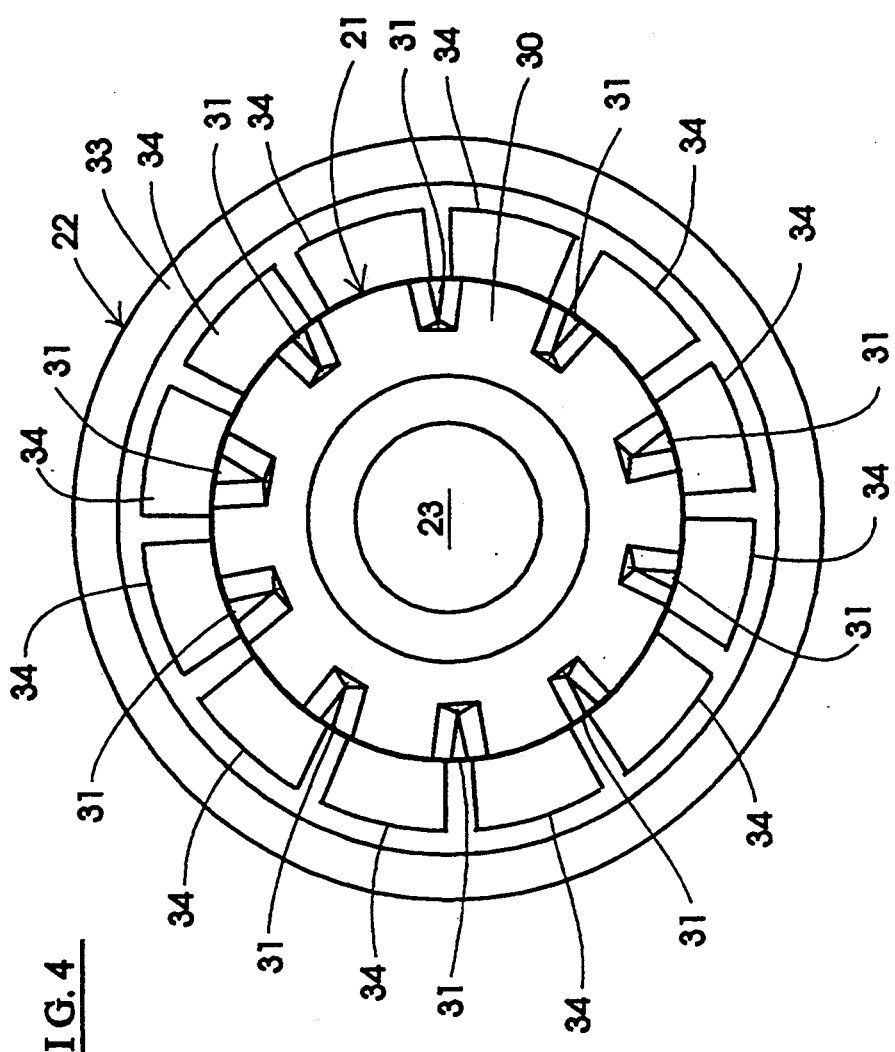
FIG. 4 depicts a section of the rotational positioning module shown in FIG. 2, the section being taken transverse to the longitudinal axis of the module.

In accordance with the invention, the central body 11 includes an integral rotary positioning module (RPM) 20, which will be described in connection with FIGS. 2 through 4, and which essentially comprises a brushless direct-current motor. With reference to FIGS. 2 through 4, the RPM 20 comprises two portions, namely, a stationary portion 21, which affixes to the cable or hose, and a rotational portion 22 to which the paravane 10 (not shown in FIGS. 2 through 4) is affixed. As will be described in detail below, the RPM 20 constitutes a motor, with the stationary portion 21 supporting wire windings through which electrical current is applied, and the rotational portion supporting magnets fabricated from rare-earth elements. The angular orientation of the rotational portion 22 in relation to the stationary portion 21 can be controlled by controlling the amount of current applied to the motor. The electric current is controlled in response to a signal from a rotational position sensor (shown in FIG. 3 under reference numeral 44). Electrical current applied to the motor by wires provided therefor in the cable or hose causes the motor to apply a torque to the rotational portion 22, and thus to the paravane 10 attached thereto, with the amount of torque being related to the applied current level. The applied torque causes a change in the rotational orientation of the wings 12A, 12B until the counter vailing torque applied to the wings by the towing medium as the paravane 10 is moved there through balances the torque applied to the wings 12A, 12B by the motor. Thus, adjusting the amount of current applied to the RPM 20 can cause an adjustment in the angular orientation of the wings in relation to the central body 11.

The detailed structure of the rotary positioning module (RPM) 20 is shown in FIGS. 3 and 4, with FIG. 3 depicting a sectional view of the RPM 20 with the section being taken along the axis 13, and FIG. 4 depicting a sectional view with the section being taken along a plane orthogonal to the axis 13 along the line "4—4" shown in FIG. 3. With reference to FIGS. 3 and 4, the stationary portion 21 comprises an elongated central member 30 which has, in the region proximate the rotational portion 22, a series of notches 31 formed therein. The notches 31 are generally longitudinal, that is, they are in a direction generally parallel to axis 13, and they generally form winding forms around which wire is wound to form field windings 32 (FIG. 4) for the motor.

The central member 30 further includes a passage 35 that extends from the field windings 32 toward the center to facilitate passage of a wire connecting the field windings 32 to a connection in the cable or hose to which the RPM 20 connects, the connection carrying electrical current from the towing platform to the field windings 32, the current in the field windings 32 effectively generating a magnetic field having a field strength related to the current. The rotational portion 22 includes a cylindrical housing member 33 which has a plurality of magnets 34 fabricated from rare-earth elements symmetrically disposed around its interior surface. It will be appreciated that the field windings 32 in the stationary portion 21 and the magnets 34 in the rotational portion 22 effectively form a brushless direct-current motor, such that, as electric current is applied to the field windings 32, the level of current will effectively control the angular orientation of the rotational portion 22 in relation to the stationary portion 21 as described above. The angular relationship of the rotor magnets and the stator windings is sensed by a rotational position sensor 44, which provides a signal to a position controller (not shown) on the towing platform which, in turn, regulates the electric current to the field windings 32. The exterior surface of the central member 30 in the region proximate the rotational portion 22, and the interior surface of the rotational portion 22, are sized so that the rotational portion 22 can be mounted over the central member 30 of the stationary portion, so that the magnets 34 and the field windings 32 will be generally in close proximity when assembled as shown in the Figures. The central member 30 may also include, in the portions between the notches, laminations of iron or another magnetic material which can be helpful in accentuating or focusing the magnetic fields generated by the field windings 32.

As shown in particular in FIG. 3, the housing member 33 of rotational portion 22 is rotatably mounted onto the central member 30 by means of radial bearings 40A, 40B. End caps 41A, 41B, with integral seals 42A, 42B, are provided outside the respective bearings 40A, 40B, which may inhibit the entry of the medium, such as water, through which the paravane 10 is towed, into the bearings 40A, 40B and any gaps between the rotational portion 22 and the stationary portion 21. A thrust bearing 43A, 43B at each end of the rotational portion 22 outside of the bearings 40A, 40B, inhibits the housing member from moving in an axial direction, thereby ensuring that the position of the rotational portion 22 will be maintained in close proximity to the central member 30 of the stationary portion 21.

The stationary portion 21 also includes several elements to facilitate attachment of the rotary positioning module (RPM) 20 to a cable or hose. As shown in FIG. 3, for example, the stationary portion has an axial passage through which the cable or hose extends. The cable or hose is encapsulated in a hose which is formed in sections 51A, 51B which separate the RPM 20 from a leading RPM (or the towing platform, if the RPM is the first along the cable or hose) and from a trailing RPM, if any. The sections 51A, 51B taper at their respective ends, and ratchet on to saw tooth shaped attachment members 50A, 50B formed in opposing ends of the stationary portion 21 (as shown in FIG. 3). Hose clamps 52A, 52B are also provided to clamp the ends of the sections 51A, 51B to the respective attachment members 50A, 50B of the stationary portion 21.

In operation, the paravane 10 is mounted on the rotary positioning module (RPM) 20, and a cable or hose is provided through passage 23, and the field windings 32 are connected to appropriate control wires (not shown) extending through the cable or hose. Thereafter, the flare ends of the hose sections 51A, 51B of the cable or hose are mounted onto the respective attachment members 50A, 50B, and respective hose clamps 52A, 52B are tightened, thereby sealing the peravane 10 to the cable or hose. As the cable or hose, with the RPM 20 attached, is deployed, the electric current to the RPM's field windings 32 may be adjusted for the angular orientation of the rotational portion 22, in relation to the stationary portion 21, to thereby adjust the orientation of the wings 12A, 12B of paravane 10 (FIG. 1) with respect to the towing medium. As noted above, by adjusting the particular orientation of the paravane 10 with respect to the towing medium, the orientation of the cable or hose attached to the paravane 10 in relation to the towing platform can be adjusted in any place perpendicular to the cable or hose axis.

The rotary positioning module (RPM) 20 provides a number of advantages. Since the angular orientation of the wings 12A, 12B is controlled electrically from the towing platform, the shape of the towed array can be more easily and readily controlled, and indeed can be easily varied while the array is being towed. The ability to vary the shape of the array as it is being towed can be of substantial benefit in seismic imaging. In addition, torsional output of the RPM 20 permits use of less expensive, higher-friction bearings in a hostile environment, such as in ocean towing. Further, since the stationary portion 21 and rotational portion 22 are both generally compact and symmetrical with respect to the towing axis 13, no unusual drag or uneven forces are developed thereby while the paravane is being towed through the towing medium.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A rotary positioning module (RPM) for use in connection with a cable or hose towed from a towing platform through a towing medium, the rotary positioning module comprising:
    a stationary portion including a cable or hose attachment means adapted to facilitate attachment of the rotary positioning module to the cable or hose, and a plurality of field windings symmetrically positioned around the cable or hose attachment means, the field windings being electrically energizable; and
    a rotational portion rotatably mounted around said stationary portion for controlling orientation of a paravane attached thereto while being towed through the towing medium to facilitate the positioning of the cable or hose, the rotational portion including a plurality of permanent magnets symmetrically positioned there around in proximity to the field windings of said stationary portion and a rotary position sensor for sensing an angular relationship between the field winding and the permanent magnets, to facilitate the angular positioning of said rotational portion, and thereby control the angular positioning of the paravane attached thereto, in relation to said stationary portion by controlling electric current provided to said field windings.

2. The rotary positioning module as defined in claim 1 in which said field windings have extending therefrom an electrical wire adapted to be connected to the towing platform to supply electric current to the field windings thereby to electrically energize the field windings.

3. The rotary positioning module as defined in claim 1 in which said permanent magnets are formed of a rare earth element.

4. The rotary positioning module as defined in claim 1 further including a radial bearing situated between said stationary portion and said rotational portion to facilitate rotational positioning of said rotational portion around said stationary portion.

5. The rotary positioning module (RPM) as defined in claim 4 in which the cable or hose attachment arrangement of the stationary portion defines an axis, the axis further defining a towing direction corresponding to the direction with which the rotary positioning module (RPM) is to be towed by the towing platform, the radial bearings being so situated as to facilitate rotation of the rotational portion about said axis.

6. The rotary positioning module (RPM) as defined in claim 5 further including thrust bearings affixed to said stationary portion for maintaining said rotational portion in a predetermined longitudinal position along said axis relative to said stationary portion.

7. The rotary positioning module (RPM) as defined in claim 5 in which said rotational portion defines end portions at opposing ends along said axis, said rotary positioning module further including end caps in sealing engagement between said rotational portion and said stationary portion.

8. The rotary positioning module (RPM) as defined in claim 1 in which the cable attachment arrangement of the stationary portion defines an axis, the axis further defining a towing direction corresponding to the direction with which the rotary positioning module is to be towed by the towing platform, the paravane comprising a pair of hydrodynamic lift members extending in opposing directions from said rotational portion in a plane which is inclined relative to said axis.

9. The rotary positioning module (RPM) as defined in claim 1 in which said hose attachment arrangement includes a passageway defining an axis and tow attachment members formed in opposing ends of said stationary portion along said axis, the cable extending through said passageway, the cable including encapsulated members that affix to the cable or hose attachment members to thereby affix the rotary positioning module to the rotary position module at a selected location along the cable or hose.

* * * * *